(12) United States Patent
Sadohara

(10) Patent No.: US 7,802,881 B2
(45) Date of Patent: Sep. 28, 2010

(54) INK SET FOR INK-JET RECORDING, INK-JET RECORDING METHOD, AND INK-JET RECORDING APPARATUS

(75) Inventor: Hitomi Sadohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/265,582

(22) Filed: Nov. 5, 2008

(65) Prior Publication Data

US 2009/0115826 A1 May 7, 2009

(30) Foreign Application Priority Data

Nov. 6, 2007 (JP) ................................ 2007-288776

(51) Int. Cl.
*G01D 11/00* (2006.01)
(52) U.S. Cl. .................. 347/100; 106/31.9; 106/31.13; 106/31.27; 106/31.6; 523/160
(58) Field of Classification Search .................. 347/100; 106/31.13, 31.9; 523/160
See application file for complete search history.

(56) References Cited

U.S. PATENT DOCUMENTS 6,902,265 B2 * 6/2005 Critelli et al. ............... 347/101

2003/0070582 A1 * 4/2003 Kitamura et al. ............ 106/31.46
2006/0082629 A1 * 4/2006 Kato et al. ..................... 347/100
2007/0064077 A1 * 3/2007 Konno .......................... 347/102
2007/0082963 A1 * 4/2007 Bhatt ............................... 522/6
2007/0196630 A1 * 8/2007 Hayes et al. ................ 428/195.1

FOREIGN PATENT DOCUMENTS

| JP | H03-050274 A | 3/1991 |
|----|--------------|--------|
| JP | H03-115471 A | 5/1991 |
| JP | H03-154187 A | 7/1991 |
| JP | H03-227378 A | 10/1991 |
| JP | H06-025553 A | 2/1994 |
| JP | 2000-309736 A | 11/2000 |
| JP | 2001-262016 A | 9/2001 |
| JP | 2005-015608 A | 1/2005 |
| JP | 2005-336485 A | 12/2005 |

* cited by examiner

*Primary Examiner*—Matthew Luu
*Assistant Examiner*—Rut Patel
(74) *Attorney, Agent, or Firm*—Baker Botts, LLP.

(57) ABSTRACT

A water-based ink set for ink-jet recording includes: the infrared absorptive ink that contains the antimony-tin composite oxide fine particles and water; and the color ink that contains the coloring agent and water. The water-based ink set for ink-jet recording is applicable to an ink-jet recording method for recording an image by ejecting the inks onto a recording medium to cause the inks to adhere to the recording medium. When an image having infrared absorptivity is recorded, at least the infrared absorptive ink is ejected onto a recording medium to cause the infrared absorptive ink to adhere to the recording medium.

11 Claims, 3 Drawing Sheets

INK SET FOR INK-JET RECORDING, INK-JET RECORDING METHOD, AND INK-JET RECORDING APPARATUS

CROSS REFERENCE TO RELATED APPLICATION

The present invention claims a priority from Japanese Patent Application No. 2007-288776, which was filed on Nov. 6, 2007, the disclosure of which is herein incorporated by reference in its entirety.

BACKGROUND OF THE INVENTION

1. Field of the Invention

The present invention relates to a water-based ink set for ink-jet recording capable of producing images that absorb infrared light, to an ink-jet recording method using the ink set, and to an ink-jet recording apparatus for implementing the method.

2. Description of the Related Art

As inks for producing code marks such as bar codes and OCR characters, infrared absorptive inks capable of producing visually unreadable code marks have been developed to improve security. As such infrared absorptive inks, for example, there were proposed inks in which a cyanine-based or naphthoquinone-based coloring agent is used and inks in which a coloring agent composed of a resin containing powder of tin-doped indium oxide (ITO) is used.

The above-mentioned infrared absorptive inks in which an organic-based coloring agent is used have a problem that the color tones of the inks cannot be controlled, because the inks have absorption in the visible range. Meanwhile, the infrared absorptive inks in which ITO powder is used have little absorption in the visible light range. ITO powder is an expensive material. In addition, generally, ITO powder is often used in inks containing an organic solvent and other similar inks and cannot be used in water-based inks and in ink-jet recording methods using the water-based inks. Moreover, in recent ink-jet recording methods, a printer is used which is provided with a replaceable ink cartridge containing an ink set composed of a plurality of different inks. In such a case, there is a demand that at least one of the inks constituting the ink set be an infrared absorptive ink having absorption in the infrared range to improve security of recorded objects.

SUMMARY

It is an object of the invention to provide a water-based ink set for ink jet recording comprising an infrared absorptive ink that absorbs electromagnetic waves in the infrared range and a color ink that has absorption in the visible light range. It is another object of the invention to provide an ink-jet recording method that uses the above ink set to produce a recorded object that absorbs electromagnetic waves in the infrared range. It is yet another object of the invention to provide an ink-jet recording apparatus for implementing the ink-jet recording method.

The present inventor has found that the above object may be achieved by using, as an infrared absorbing agent, antimony-tin composite oxide fine particles (hereinafter, "antimony-tin composite oxide fine particles" may be referred to as "ATO fine particles") that are less expensive than the ITO powder, absorb little visible light, and absorb electromagnetic waves in the near-infrared range.

An aspect of the present invention provides a water-based ink set for ink-jet recording comprising: an infrared absorptive ink comprising ATO fine particles and water; and a color ink comprising a coloring agent and water.

Another aspect of the present invention also provides an ink-jet recording method for recording an image by ejecting at least one ink of a plurality of different inks constituting an ink-set for ink-jet recording onto a recording medium to cause the ink to adhere to the recording medium. The method is characterized in that the ink-set for ink-jet recording is a water-based ink set for ink-jet recording comprising: an infrared absorptive ink that comprises ATO fine particles and water; and a color ink that comprises a coloring agent and water, and that an image having infrared absorptivity is recorded by ejecting at least the infrared absorptive ink onto a recording medium to cause the infrared absorptive ink to adhere to the recording medium.

Still another aspect of the present invention also provides an ink-jet recording apparatus comprising: an ink set storage unit that stores inks of a water-based ink set for ink-jet recording, the inks of the water-based ink set for ink-jet recording comprising an infrared absorptive ink that comprises ATO fine particles and water, and a color ink that comprises a coloring agent and water; and an ejection mechanism that ejects a droplet of each of the inks of the water-based ink set for ink-jet recording.

DETAILED DESCRIPTION OF THE PREFERRED EMBODIMENTS

Figure 1:
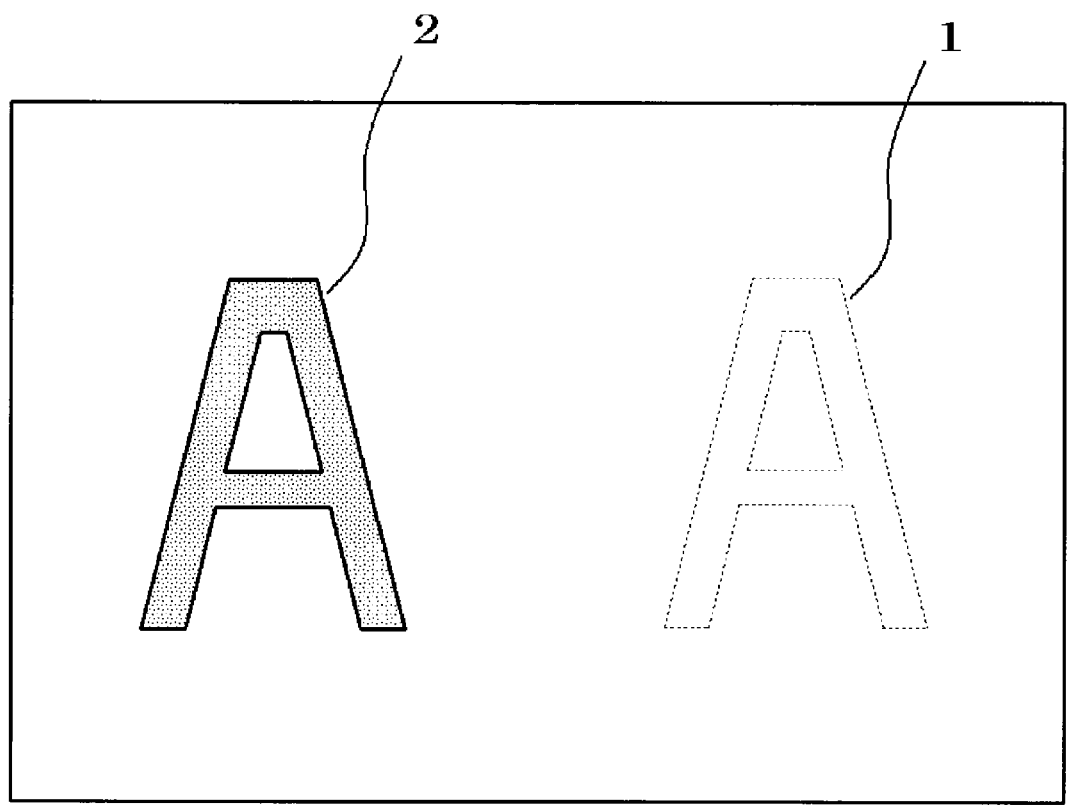
FIG. 1 shows an example of recorded objects obtained by using a water-based ink set for ink-jet recording comprising an infrared absorptive ink comprising ATO fine particles.

The water-based ink set for ink-jet recording comprises: an infrared absorptive ink that comprises ATO fine particles and water; and a color ink that comprises a coloring agent and water.

In the water-based ink set for ink-jet recording, one of the constituent inks is the infrared absorptive ink comprising the ATO fine particles serving as an infrared absorbing agent. The ATO fine particles have little absorption in the visible light range but exhibit absorbance in the near-infrared range at a wavelength of 800 nm or more, and the absorbance increases as the wavelength increases. With the water-based ink set for ink-jet recording comprising the infrared absorptive ink, recorded objects may be produced which comprise visually unreadable complicated code marks having absorption in the near-infrared range. Moreover, the degree of security of recorded media having images recorded with the infrared absorptive ink of the water-based ink set for ink-jet recording may be determined by evaluating the reflection or absorption characteristics in the infrared range. The determination of the degree of security may be reliably made in a mechanical manner using a spectroscopic apparatus rather than by visual evaluation.

When the average particle diameter of the ATO fine particles used in the infrared absorptive ink constituting the water-based ink set for ink-jet recording is too small, the specific surface area of the ATO fine particles is excessively large. In such a case, a strong attractive force acts between the particles, and the dispersion stability of the ATO fine particles in the infrared absorptive ink for ink-jet recording tends to decrease. When the average particle diameter thereof is too large, light is strongly scattered. The transparency of images recorded with the infrared absorptive ink for ink-jet recording tends to decrease, and an ink-jet recording head is easily clogged. The average particle diameter of the ATO fine particles is in the range of from about 5 nm to about 800 nm and in the range of from about 5 nm to about 200 nm. In the above ranges, the dispersion stability of the infrared absorptive ink for ink-jet recording may be ensured. In addition, substantially transparent code marks and the like may be recorded. The transparency of transparent substrates, such as films for an overhead projector, used as recording media may be maintained, and the transparency of undercoat layers may be maintained.

In particular, when code mark patterns are required to have high transparency, i.e., the scattering of light in the visible light range of from about 400 nm to about 780 nm must be suppressed, the average particle diameter of the ATO fine particles is about 200 nm or less and about 150 nm or less. This is because when the particle diameter is about 200 nm or less, the amount of scattered light decreases and Rayleigh scattering occurs. In the Rayleigh scattering region, the intensity of the scattered light decreases in inverse proportion to the sixth power of the particle diameter, and the transparency increases as the particle diameter decreases. When the particle diameter is about 150 nm or less, the amount of scattered light further decreases, and the absorption efficiency is further improved.

In view of the dispersion stability, the average particle diameter of the ATO fine particles is about 10 nm or more, about 20 nm or more and about 50 nm or more.

Particles produced by mixing antimony oxide powder and tin oxide powder, sintering the mixed powder at about 1,000° C. to about 1,300° C., and subjecting the sintered product to size reduction according to routine methods may be used as the above ATO fine particles. Specific examples of the ATO fine particles include, without any limitations, SN-100D (product of Ishihara Sangyo Kaisha, Ltd.), TDL (product of JEMCO Inc.) and the like.

When the amount of the above-described ATO fine particles in the infrared absorptive ink is too small, the infrared absorptivity imparted to recording media is insufficient. Multiple printing, for example, must be performed to obtain sufficient infrared absorptivity, and, disadvantageously, the process for forming code marks becomes complicated. When the amount of the above-described ATO fine particles is too large, disadvantageously, nozzles of an ink-jet recording head is easily clogged. The amount of the ATO fine particles in the infrared absorptive ink is in the range of from about 0.3 wt % to about 10 wt %, in the range of from about 0.3 wt % to about 7 wt % and in the range of from about 0.5 wt % to about 7 wt %.

The infrared absorptive ink comprises water. Deionized water is used. The ratio of the amount of water depends on the type of the water soluble organic solvent used, the composition of the ink and the desired characteristics of the ink and is determined over a wide range. When the amount of water is too small, the viscosity of the ink increases to cause difficulty in ejecting the ink. When the amount of water is too large, the ATO fine particles or an additive is precipitated and/or aggregated due to the evaporation of water, so that nozzles of an ink-jet recording head is more likely to be clogged. The amount of water with respect to the total amount of the infrared absorptive ink is in the range of from about 10 wt % to about 95 wt %, in the range of from about 10 wt % to about 80 wt % and in the range of from about 20 wt % to about 80 wt %.

The infrared absorptive ink further may comprises water soluble organic solvents, such as a humectant and a penetrant, used commonly in ink-jet recording inks.

The humectant is added to the ink to prevent clogging of nozzles of an ink-jet recording head. Examples of the humectant include, without any limitations: water soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol and the like.

When the ratio of the amount of the humectant in the infrared absorptive ink is too small, clogging of nozzles of an ink-jet recording head is not sufficiently prevented. When the amount is too large, the viscosity of the ink increases to cause difficulty in ejecting the ink. The amount of the humectant with respect to the total amount of the infrared absorptive ink is in the range of from about 5 wt % to about 50 wt %, in the range of from about 10 wt % to about 40 wt % and in the range of from about 15 wt % to about 35 wt %.

The penetrant is used to facilitate the penetration of the ink into a recording material after printing and to adjust the surface tension of the ink. Examples of the penetrant include, without any limitations: glycol ethers typified by ethylene glycol-based alkyl ethers and propylene glycol-based alkyl ethers and the like. Examples of the ethylene glycol-based alkyl ethers include, without any limitations: ethylene glycol methyl ether, ethylene glycol ethyl ether, ethylene glycol-n-propyl ether, ethylene glycol-n-butyl ether, ethylene glycol isobutyl ether, diethylene glycol methyl ether, diethylene glycol ethyl ether, diethylene glycol-n-propyl ether, diethylene glycol-n-butyl ether, diethylene glycol isobutyl ether, triethylene glycol methyl ether, triethylene glycol ethyl ether, triethylene glycol-n-propyl ether, triethylene glycol-n-butyl ether, triethylene glycol isobutyl ether and the like. Examples of the propylene glycol-based alkyl ethers include, without any limitations: propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether and the like.

When the ratio of the amount of the penetrant in the infrared absorptive ink is too small, sufficient penetrability is not obtained. When the amount is too large, the penetrability becomes excessively high, and blurring such as feathering tends to occur. The amount of the penetrant with respect to the total amount of the infrared absorptive ink is in the range of from about 0.5 wt % to about 10 wt % and in the range of from about 0.5 wt % to about 7 wt %.

In addition to the humectant and the penetrant, another water soluble organic solvent may be added to the infrared absorptive ink for the purposes of, for example, preventing the ink from drying at the end portions of nozzles of an ink-jet recording head, increasing the printing density and developing vivid color. Examples of such a water soluble organic solvent include, without any limitations: lower alcohols such as methyl alcohol, ethyl alcohol, n-propyl alcohol, isopropyl alcohol, n-butyl alcohol, sec-butyl alcohol, tert-butyl alcohol and the like; amides such as dimethylformamide, dimethylacetamide and the like; ketones and keto-alcohols such as acetone, diacetone alcohol and the like; ethers such as tetrahydrofuran, dioxane and the like; glycerin; pyrrolidones such as 2-pyrrolidone, N-methyl-2-pyrrolidone and the like; 1,3-dimethyl-2-imidazolidinone; and the like.

Various surfactants may be added to the infrared absorptive ink to adjust the surface tension. Examples of the surfactants include, without any limitations: anionic surfactants such as higher alcohol sulfate ester salts, liquid fatty oil sulfate ester salts, alkyl allyl sulfonates and the like; and non-ionic surfactants such as polyoxyethylene alkyl ethers, polyoxyethylene alkyl esters, sorbitan alkyl esters, polyoxyethylene sorbitan alkyl esters and the like.

The infrared absorptive ink may comprise a coloring agent having absorption in the visible light range (described later) but may be a colorless transparent ink not comprising any coloring agent. In such a manner, visually unreadable images that can be recognized only by spectroscopic measurement in the infrared range may be formed to improve security.

The infrared absorptive ink constituting the water-based ink set for ink-jet recording may be manufactured by mixing the above ATO fine particles and the solvents such as water, and uniformly dispersing the ATO fine particles in the solvents according to routine methods.

Examples of the color ink include not only a yellow ink, a magenta ink, a cyan ink and other chromatic inks, but also a black ink. The coloring agent used in the color ink constituting in the water-based ink set for ink-jet recording may be selected from among water soluble dyes, pigments and mixtures thereof. Images recorded with such a color ink exhibit an absorption spectrum originating from the coloring agent in the visible light range and preferably do not exhibit absorption in the infrared range. In such a manner, the images recorded with the color ink may be readily and clearly distinguished from images recorded with the infrared absorptive ink.

Any water soluble dye used in conventional ink-jet inks may be used as the water soluble dye used in color inks, so long as it satisfies the required vividness, water solubility, stability, light fastness, ozone resistance and other required properties. Examples of the dye include, without any limitations, various types of dyes such as direct dyes, acid dyes, basic dyes and reactive dyes. These exemplary dyes are classified according to their structure into azo dyes, metal complex dyes, naphthol dyes, anthraquinone dyes, indigo dyes, carbonium dyes, quinoneimine dyes, xanthene dyes, aniline dyes, quinoline dyes, nitro dyes, nitroso dyes, benzoquinone dyes, naphthoquinone dyes, phthalocyanine dyes, metal phthalocyanine dyes and the like.

Examples of the water soluble dye include, without any limitations: C.I. Direct Blacks 17, 19, 32, 51, 71, 108, 146, 154, 168 and the like; C.I. Direct Yellows 12, 24, 26, 27, 28, 33, 39, 58, 86, 98, 100, 132, 142 and the like; C.I. Direct Reds 4, 17, 28, 37, 63, 75, 79, 80, 83, 99, 220, 224, 227 and the like; C.I. Direct Violets 47, 48, 51, 90, 94 and the like; C.I. Direct Blues 1, 6, 8, 15, 22, 25, 71, 76, 80, 86, 90, 106, 108, 123, 163, 165, 199, 226 and the like; C.I. Acid Blacks 2, 7, 24, 26, 31, 52, 63, 112, 118 and the like; C.I. Acid Yellows 3, 11, 17, 19, 23, 25, 29, 38, 42, 49, 59, 61, 71, 72 and the like; C.I. Acid Reds 1, 6, 8, 17, 18, 32, 35, 37, 42, 51, 52, 57, 80, 85, 87, 92, 94, 115, 119, 131, 133, 134, 154, 181, 186, 249, 254, 256, 289, 315, 317, 407 and the like; C.I. Acid Violets 10, 34, 49, 75 and the like; C.I. Acid Blues 9, 22, 29, 40, 59, 62, 93, 102, 104, 113, 117, 120, 167, 175, 183, 229, 234 and the like; C.I. Basic Blacks 2 and the like; C.I. Basic Yellows 40 and the like; C.I. Basic Reds 1, 2, 9, 12, 13, 14, 37 and the like; C.I. Basic Violets 7, 14, 27 and the like; C.I. Basic Blues 1, 3, 5, 7, 9, 24, 25, 26, 28, 29 and the like; C.I. Reactive Yellows 2, 3, 13, 15 and the like; C.I. Reactive Reds 4, 23, 24, 31, 56, 180 and the like; and C.I. Reactive Blues 7, 13, 21 and the like.

When the water soluble dye is used in the color ink, the ratio of the amount of the water soluble dye depends on a predetermined printing density and color. When the amount is too small, the color is not satisfactorily developed on a recording medium. When the amount is too large, nozzles of an ink-jet recording head can be easily clogged. The amount of the water soluble dye with respect to the total amount of the color ink is in the range of from about 0.1 wt % to about 10 wt %, in the range of from about 0.3 wt % to about 10 wt % and in the range of from about 0.5 wt % to about 7 wt %.

When a pigment is used, an infrared transparent pigment may be used. Examples of such a pigment include, without any limitations: yellow pigments such as C.I. Pigment Yellows 3, 13, 74, 83, 154 and the like; magenta pigments such as C.I. Pigment Reds 5, 48, 112, 122, 177, 202, 207 and the like; and cyan pigments such as C.I. Pigment Blues 15, 15:3, 15:4, 16, 60 and the like.

In case of using a pigment, when the amount of the pigment used in the color ink is too small, the color is not satisfactorily developed on a recording medium. When the amount is too large, nozzles of an ink-jet recording head is easily clogged. The amount of the pigment with respect to the total amount of the color ink is in the range of from about 1 wt % to about 10 wt % and in the range of from about 1 wt % to about 7 wt %.

The particle diameter of the pigment is in the range of from about 5 nm to about 800 nm because of the same reason as that for the ATO fine particles. The upper limit of the particle diameter is about 200 nm or less and about 150 nm or less. The lower limit of the particle diameter is about 10 nm or more, about 20 nm or more and about 50 nm or more.

The color ink constituting the water-based ink set for ink-jet recording comprises water. Deionized water is used. Because of the same reason as that for the infrared absorptive ink described above, the amount of water with respect to the total amount of the color ink is in the range of from about 10 wt % to about 95 wt %, in the range of from about 10 wt % to about 80 wt % and in the range of from about 20 wt % to about 80 wt %.

The color ink further comprises water soluble organic solvents, such as a humectant and a penetrant, used commonly in ink-jet recording inks. Any humectant and penetrant described for the infrared absorptive ink may be used. Because of the same reason as that for the infrared absorptive ink, the ratio of the amount of the humectant in the color ink with respect to the total amount of the color ink is in the range of from about 5 wt % to about 50 wt %, in the range of from about 10 wt % to about 40 wt % and in the range of from about 15 wt % to about 35 wt %. The ratio of the amount of the penetrant in the color ink with respect to the total amount of the color ink is in the range of from about 0.5 wt % to about 10 wt % and in the range of from about 0.5 wt % to about 7 wt %, because of the same reason as that for the infrared absorptive ink.

As in the infrared absorptive ink, the color ink may comprise, in addition to the humectant and the penetrant, another water soluble organic solvent for the purposes of, for example, preventing the ink from drying at the end portions of nozzles of an ink-jet recording head, increasing the printing density and developing vivid color. Moreover, the color ink may comprise various surfactants to adjust the surface tension.

The color ink constituting in the water-based ink set for ink-jet recording may be manufactured by mixing the above coloring agent and the solvents such as water, and uniformly dispersing or dissolving the coloring agent in the solvents according to routine methods.

The water-based ink set for ink-jet recording may be produced as a combination of the above infrared absorptive ink and the above color ink. In a specific exemplary embodiment for producing the combination of the inks, the inks are filled into an ink cartridge and are used as the ink set.

The above-described water-based ink set for ink-jet recording may be used in an ink-jet recording method described below. Specifically, in this ink-jet recording method, an image is recorded by ejecting at least one ink of a plurality of different inks constituting an ink set for ink-jet recording onto a recording medium to cause the ink to adhere to the recording medium. The method is characterized in that the ink-set for ink-jet recording is a water-based ink set for ink-jet recording comprising: an infrared absorptive ink that comprises ATO fine particles and water; and a color ink that comprises a coloring agent and water. In this method, an image having infrared absorptivity is recorded by ejecting at least the infrared absorptive ink onto a recording medium to cause the infrared absorptive ink to adhere to the recording medium.

This ink-jet recording method may be the same as conventional ink-jet recording methods, except that the water-based ink set for ink-jet recording is used as the ink set and an image having infrared absorptivity is recorded using at least an infrared absorptive ink. Any recording medium used for the conventional ink-jet recording methods may be used as the recording medium. For example, recording paper having on one or both sides an ink-receiving layer capable of receiving a water-based ink-jet ink may be used.

In one embodiment of the ink-jet recording method, an invisible image 1 recorded with the infrared absorptive ink and a visible image 2 recorded with the color ink are formed so as not to overlap with each other on a recording medium, as shown in FIG. 1. In this embodiment, the position of the recorded invisible image cannot be visually identified, and the visible image serves as a dummy image. An advantage is obtained in that more sophisticated security is achieved.

Figure 2:
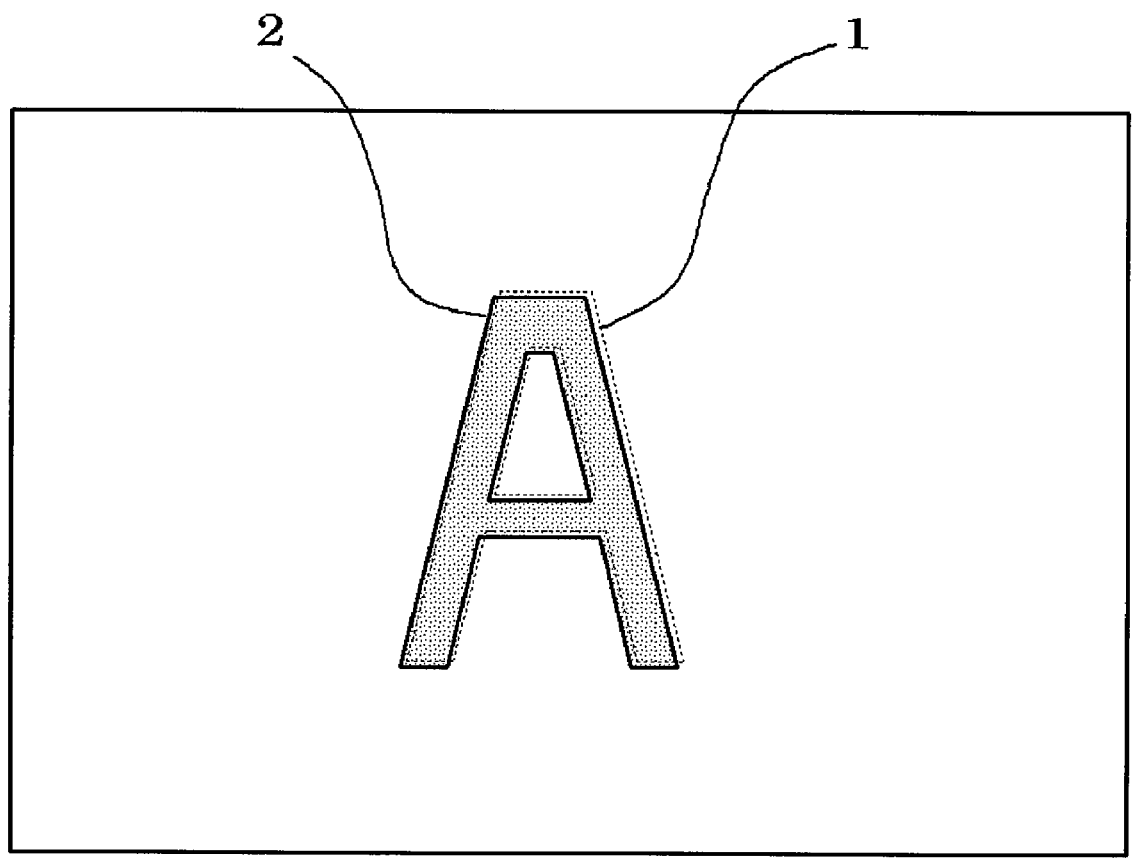
FIG. 2 shows another example of the recorded objects obtained by using the water-based ink set for ink-jet recording comprising the infrared absorptive ink comprising the ATO fine particles.
Figure 3:
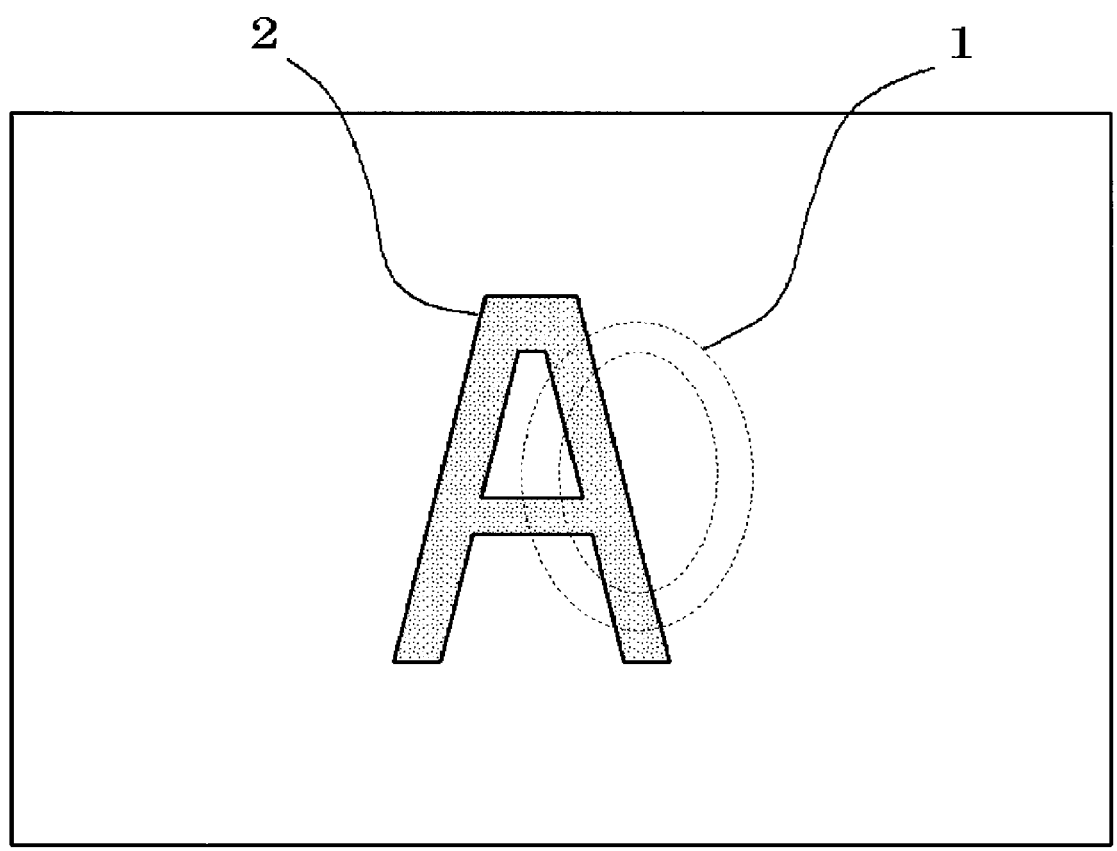
FIG. 3 shows another example of the recorded objects obtained by using the water-based ink set for ink-jet recording comprising the infrared absorptive ink comprising the ATO fine particles.

In other embodiments of the ink-jet recording method, an invisible image recorded with the infrared absorptive ink and a visible image recorded with the color ink are formed such that at least parts thereof overlap with each other on a recording medium. In the embodiment shown in FIG. 2, both the images completely overlap with each other. In the embodiment shown in FIG. 3, parts of the images overlap with each other. In the embodiment shown in FIG. 2, an advantage is obtained in that security codes of different colors may be recorded without complicated printing process. In addition, because the visible image having no infrared absorptivity is recorded as a dummy image, the position of the invisible image having infrared absorptivity is not easily identified. An advantage is obtained in that more sophisticated security is achieved. In the embodiment summarized in FIG. 3, because the positions of the overlapping parts of the visible and invisible images may be adjusted precisely, an advantage is obtained in that more sophisticated security is achieved by reading the details of the overlapping parts.

The water-based ink set for ink-jet recording and the ink-jet recording method may be applied to an ink-jet recording apparatus comprising: an ink set storage unit that stores the inks of the water-based ink set for ink-jet recording; and an ejection mechanism that ejects droplets of each of the inks of the water-based ink set for ink-jet recording. The structure of this ink-jet recording apparatus may be the same as those of conventional ink-jet recording apparatuses, except that the water-based ink set for ink-jet recording is used as the ink set.

EXAMPLES

The present invention will next be specifically described by way of Examples and Comparative Examples. First, infrared absorptive inks comprising ATO fine particles, and black, yellow, magenta and cyan inks each having absorption in the visible range were prepared. An water-based ink set for ink-jet recording of each of Examples and Comparative Examples was produced as a combination of the prepared inks. Subsequently, the inks of each ink set were filled in an ink cartridge, and the ink cartridge was installed in a digital multifunction device equipped with an ink-jet printer (DCP-115, product of Brother Industries, Ltd.). The inks were ejected on Brother A4 ink-jet paper (BP60MA) by the ink-jet recording method, and a reflection spectrum in the infrared range was measured in a recording area formed on the ink-jet recording paper. The details of the procedure will be described below.

(1) Preparation of the Inks

Each of the inks was prepared using the procedures described below. The compositions (percent by weight) of the prepared inks are summarized in Tables 1 and 2. The average particle diameter of the secondary particles of the ATO fine particles used is a value obtained through the measurement of the particle diameter distribution of an ATO fine particle dispersion (SN-100D, product of Ishihara Sangyo Kaisha, Ltd.). Specifically, the particle diameter distribution was measured in a diluted solution obtained by diluting the ATO fine particle dispersion 1.500-fold with ion exchanged water by using a dynamic light scattering nano-analyzer (LB 500, product of HORIBA, Ltd.).

a) Infrared Absorptive Ink 1

54.3 parts by weight of water (ion exchanged water), 26.0 parts by weight of glycerin and 3.0 parts by weight of dipropylene glycol-n-propyl ether were mixed, whereby 83.3 parts by weight of an ink solvent was prepared. Subsequently, 83.3 parts by weight of the prepared ink solvent was gradually added to 16.7 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby infrared absorptive ink 1 was prepared. The amount of the ATO fine particles in the infrared absorptive ink 1 was 5 wt %.

b) Infrared Absorptive Ink 2

60.0 parts by weight of water (ion exchanged water), 27.0 parts by weight of glycerin and 3.0 parts by weight of dipropylene glycol-n-propyl ether were mixed, whereby 90.0 parts by weight of an ink solvent was prepared. Subsequently, 90.0 parts by weight of the prepared ink solvent was gradually added to 10.0 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby infrared absorptive ink 2 was prepared. The amount of the ATO fine particles in the infrared absorptive ink 2 was 3 wt %.

c) Infrared Absorptive Ink 3

65.7 parts by weight of water (ion exchanged water), 28.0 parts by weight of glycerin and 3.0 parts by weight of dipropylene glycol-n-propyl ether were mixed, whereby 96.7 parts by weight of an ink solvent was prepared. Subsequently, 96.7 parts by weight of the prepared ink solvent was gradually added to 3.3 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby infrared absorptive ink 3 was prepared. The amount of the ATO fine particles in the infrared absorptive ink 3 was 1 wt %.

d) Infrared Absorptive Ink 4

66.3 parts by weight of water (ion exchanged water), 29.0 parts by weight of glycerin and 3.0 parts by weight of dipropylene glycol-n-propyl ether were mixed, whereby 98.3 parts by weight of an ink solvent was prepared. Subsequently, 98.3 parts by weight of the prepared ink solvent was gradually added to 1.7 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby infrared absorptive ink 4 was prepared. The amount of the ATO fine particles in the infrared absorptive ink 4 was 0.5 wt %.

e) Infrared Absorptive Ink 5

66.7 parts by weight of water (ion exchanged water), 30.0 parts by weight of glycerin and 3.0 parts by weight of dipropylene glycol-n-propyl ether were mixed, whereby 99.7 parts by weight of an ink solvent was prepared. Subsequently, 99.7 parts by weight of the prepared ink solvent was gradually added to 0.3 parts by weight of an ATO fine particle dispersion (SN-100D, product of Ishihara Sangyo Kaisha, Ltd., the average diameter of secondary particles: 128 nm, solids content: 30 wt %) under stirring. After stirred for 30 minutes, the mixture was filtrated through a membrane filter having a pore diameter of 1 μm, whereby infrared absorptive ink 5 was prepared. The amount of the ATO fine particles in the infrared absorptive ink 5 was 0.1 wt %.

f) Color Ink 1

3.0 parts by weight of C.I. Direct Black 154, 68.0 parts by weight of water (ion exchanged water), 26.0 parts by weight of glycerin and 3.0 parts by weight of dipropylene glycol-n-propyl ether were mixed, and the mixture was stirred for 30 minutes. Subsequently, the mixture was filtrated through a membrane filter having a pore diameter of 1 μm, whereby color ink 1 (a black dye ink) was prepared.

g) Color Ink 2

The same procedure as in the color ink 1 was repeated except that the ink composition was changed as summarized in Table 2, whereby color ink 2 (a yellow dye ink) was prepared.

h) Color Ink 3

The same procedure as in the color ink 1 was repeated except that the ink composition was changed as summarized in Table 2, whereby color ink 3 (a magenta dye ink) was prepared.

g) Color Ink 4

The same procedure as in the color ink 1 was repeated except that the ink composition was changed as summarized in Table 2, whereby color ink 4 (a cyan dye ink) was prepared.

j) Color Ink 5

15.0 parts by weight of C.I. Pigment Yellow 74, 5.0 parts by weight of polyoxyethylene lauryl ether ammonium sulfate, 15.0 parts by weight of glycerin and 65 parts by weight of water (ion exchanged water) were mixed. Subsequently, the mixture was subjected to dispersion in a wet sand mill using zirconia beads having a diameter of 0.3 mm as a medium, whereby a yellow pigment dispersion was obtained.

Separately, 54.0 parts by weight of water (ion exchanged water), 24.0 parts by weight of glycerin and 2.0 parts by weight of dipropylene glycol-n-propyl ether were mixed, whereby 80.0 parts by weight of an ink solvent was prepared. 80.0 parts by weight of the prepared ink solvent was gradually added to 20 parts by weight of the yellow pigment dispersion under stirring. The mixture was further stirred for 30 minutes and was filtrated through a membrane filter having a pore diameter of 1 μm, whereby color ink 5 (a yellow pigment ink) was prepared.

k) Color Ink 6

The same procedure as in the color ink 5 was repeated except that the ink composition was changed as summarized in Table 2, whereby color ink 6 (a magenta pigment ink) was prepared.

l) Color Ink 7

The same procedure as in the color ink 5 was repeated except that the ink composition was changed as summarized in Table 2, whereby color ink 7 (a cyan pigment ink) was prepared.

TABLE 1

|  |  | Infrared absorption ink |  |  |  |  |
|---|---|---|---|---|---|---|
| Ink No. |  | 1 | 2 | 3 | 4 | 5 |
| Ink composition (wt %) | Water (ion exchanged water) | 54.3 | 60.0 | 65.7 | 66.3 | 66.7 |
|  | Glycerin | 26.0 | 27.0 | 28.0 | 29.0 | 30.0 |
|  | Dipropylene glycol-n-propyl ether | 3.0 | 3.0 | 3.0 | 3.0 | 3.0 |
|  | SN-100D (*1) | 16.7 | 10.0 | 3.3 | 1.7 | 0.3 |
| Amount of ATO fine particles (wt %) |  | 5.0 | 3.0 | 1.0 | 0.5 | 0.1 |

(*1): Product of Ishihara Sangyo Kaisha, Ltd., aqueous dispersion of ATO fine particles, solids content: 30 wt %
* The ink composition is expressed in the weight percent ratio of the weight of each component actually comprised in the ink to the total weight of the ink.

TABLE 2

|  |  | Color ink |  |  |  |  |  |  |
|---|---|---|---|---|---|---|---|---|
| Ink No. |  | 1 | 2 | 3 | 4 | 5 | 6 | 7 |
| Ink composition (wt %) | Water (ion exchanged water) | 68.0 | 68.5 | 68.3 | 67.1 | 67.0 | 66.8 | 66.5 |
|  | Glycerin | 26.0 | 26.5 | 26.2 | 27.0 | 27.0 | 26.0 | 27.5 |
|  | Dipropylene glycol-n- propyl ether | 3.0 | 3.0 | 3.0 | 3.0 | 2.0 | 2.0 | 2.0 |
|  | C.I. Direct Black 154 | 3.0 | — | — | — | — | — | — |
|  | C.I. Direct Yellow 86 | — | 0.4 | — | — | — | — | — |

TABLE 2-continued

|  | Color ink | | | | | | |
|---|---|---|---|---|---|---|---|
| Ink No. | 1 | 2 | 3 | 4 | 5 | 6 | 7 |
| C.I. Direct Yellow 132 | — | 1.6 | — | — | — | — | — |
| C.I. Reactive Red 180 | — | — | 2.5 | — | — | — | — |
| C.I. Direct Blue 199 | — | — | — | 2.9 | — | — | — |
| C.I. Pigment Yellow 74 | — | — | — | — | 3.0 | — | — |
| C.I. Pigment Red 122 | — | — | — | — | — | 4.0 | — |
| C.I. Pigment Blue 15:3 | — | — | — | — | — | — | 3.0 |
| Polyoxyethylene lauryl ether ammonium sulfate (*2) | — | — | — | — | 1.0 | 1.2 | 1.0 |

(*1): Product of Ishihara Sangyo Kaisha, Ltd., aqueous dispersion of ATO fine particles, solids content: 30 wt %
(*2): Average polymerization degree of oxyethylene = 12
* The ink composition is expressed in the weight percent ratio of the weight of each comprised actually contained in the ink to the total weight of the ink.

(2) Measurement of Infrared Reflection Spectrum of Recorded Objects and Evaluation of Infrared Absorptivity One of the thus prepared infrared absorptive inks and one of the thus prepared color inks were used in combination as summarized in Table 3, and each combination of the inks was filled in a predetermined ink cartridge. The ink cartridge was installed in a digital multifunction device equipped with an ink-jet printer (DCP-115, product of Brother Industries, Ltd.). In each of experiments Nos. 1 to 5 in Table 3, one of the infrared absorptive inks was used alone. In each of experiments Nos. 6 to 40 in Table 3, one of the water-based ink sets for ink-jet recording was used in which one of the infrared absorptive inks and one of the color inks were used in combination. In each of experiments Nos. 41 to 47, one of the color inks was used alone. A rectangular solid printed image was first recorded with the infrared absorptive ink on Brother A4 ink-jet paper (BP60MA), and subsequently a rectangular solid printed image was recorded with the color ink on the previously recorded solid printed image such that the printed images overlap with each other. The reflection spectrum of the recorded object with respect to the reflectivity of the recording medium was measured in a wavelength range of from 380 nm to 2,000 nm by using a spectrophotometer (UV-3100PC, product of Shimadzu Corporation). The infrared absorptivity of the recorded object was evaluated by the criteria below according to the reflectivity at wavelengths of 900 nm, 1,400 nm and 2,000 nm. The results obtained are summarized in Table 3.

<Criteria for Evaluating Infrared Absorptivity>

AA: The reflectivity is less than 60% (sufficiently high infrared absorptivity was found).

A: The reflectivity is 60% or more and less than 75% (sufficiently high infrared absorptivity was found).

B: The reflectivity is 75% or more and less than 90% (infrared absorptivity was found).

C: The reflectivity is 90% or more and less than 95% (absorption was weak, but infrared absorptivity was found).

D: The reflectivity is 95% or more (no infrared absorptivity was found).

TABLE 3

| | Infrared absorptive ink | | | 900 nm | | 1,400 nm | | 2,000 nm | |
|---|---|---|---|---|---|---|---|---|---|
| Experiment No. | No. | Amount of ATO fine particles (wt %) | Color ink No. | Reflectivity (%) | Evaluation result | Reflectivity (%) | Evaluation result | Reflectivity (%) | Evaluation result |
| 1 | 1 | 5.0 | — | 76.23 | B | 50.40 | AA | 30.21 | AA |
| 2 | 2 | 3.0 | | 83.56 | B | 61.14 | A | 37.59 | AA |
| 3 | 3 | 1.0 | | 94.98 | C | 83.35 | B | 64.11 | A |
| 4 | 4 | 0.5 | | 97.89 | D | 92.55 | C | 82.24 | B |
| 5 | 5 | 0.1 | | 99.23 | D | 96.64 | D | 91.75 | C |
| 6 | 1 | 5.0 | 1 | 79.15 | B | 54.78 | AA | 33.00 | AA |
| 7 | 2 | 3.0 | | 86.89 | B | 67.21 | A | 44.33 | AA |
| 8 | 3 | 1.0 | | 95.02 | D | 85.28 | B | 69.50 | A |
| 9 | 4 | 0.5 | | 97.81 | D | 92.26 | C | 81.99 | B |
| 10 | 5 | 0.1 | | 99.12 | D | 96.30 | D | 90.94 | C |
| 11 | 1 | 5.0 | 2 | 78.14 | B | 53.22 | AA | 32.01 | AA |
| 12 | 2 | 3.0 | | 86.39 | B | 66.38 | A | 43.89 | AA |
| 13 | 3 | 1.0 | | 95.02 | D | 84.27 | B | 66.60 | A |
| 14 | 4 | 0.5 | | 97.29 | D | 91.92 | C | 81.49 | B |
| 15 | 5 | 0.1 | | 98.93 | D | 96.21 | D | 90.30 | C |
| 16 | 1 | 5.0 | 3 | 78.70 | B | 54.26 | AA | 32.45 | AA |
| 17 | 2 | 3.0 | | 86.15 | B | 65.97 | A | 42.96 | AA |
| 18 | 3 | 1.0 | | 93.76 | C | 82.96 | B | 64.47 | A |
| 19 | 4 | 0.5 | | 98.12 | D | 92.71 | C | 82.07 | B |
| 20 | 5 | 0.1 | | 99.54 | D | 96.59 | D | 89.77 | B |
| 21 | 1 | 5.0 | 4 | 78.65 | B | 54.08 | AA | 32.32 | AA |
| 22 | 2 | 3.0 | | 87.15 | B | 67.78 | A | 45.07 | AA |
| 23 | 3 | 1.0 | | 94.57 | C | 84.81 | B | 68.29 | A |
| 24 | 4 | 0.5 | | 97.43 | D | 91.86 | C | 81.24 | B |
| 25 | 5 | 0.1 | | 98.91 | D | 96.59 | D | 91.06 | C |

TABLE 3-continued

| | Infrared absorptive ink | | | 900 nm | | 1,400 nm | | 2,000 nm | |
|---|---|---|---|---|---|---|---|---|---|
| Experiment No. | No. | Amount of ATO fine particles (wt %) | Color ink No. | Reflectivity (%) | Evaluation result | Reflectivity (%) | Evaluation result | Reflectivity (%) | Evaluation result |
| 26 | 1 | 5.0 | 5 | 77.15 | B | 52.30 | AA | 31.21 | AA |
| 27 | 2 | 3.0 | | 87.19 | B | 67.38 | A | 44.75 | AA |
| 28 | 3 | 1.0 | | 94.62 | C | 84.68 | B | 68.57 | A |
| 29 | 4 | 0.5 | | 96.92 | D | 91.60 | C | 80.27 | B |
| 30 | 5 | 0.1 | | 98.87 | D | 95.91 | D | 90.07 | C |
| 31 | 1 | 5.0 | 6 | 78.70 | B | 54.26 | AA | 32.45 | AA |
| 32 | 2 | 3.0 | | 86.15 | B | 65.97 | A | 42.96 | AA |
| 33 | 3 | 1.0 | | 93.76 | C | 82.96 | B | 64.47 | A |
| 34 | 4 | 0.5 | | 98.12 | D | 92.71 | C | 82.07 | B |
| 35 | 5 | 0.1 | | 99.54 | D | 96.59 | D | 89.77 | C |
| 36 | 1 | 5.0 | 7 | 77.02 | B | 53.91 | AA | 33.05 | AA |
| 37 | 2 | 3.0 | | 85.55 | B | 67.89 | A | 46.02 | AA |
| 38 | 3 | 1.0 | | 92.63 | C | 86.46 | B | 72.41 | A |
| 39 | 4 | 0.5 | | 95.82 | D | 91.73 | C | 80.69 | B |
| 40 | 5 | 0.1 | | 97.00 | D | 96.11 | D | 90.41 | C |
| 41 | — | — | 1 | 99.59 | D | 98.59 | D | 96.67 | D |
| 42 | | | 2 | 99.76 | D | 98.67 | D | 96.35 | D |
| 43 | | | 3 | 99.87 | D | 98.83 | D | 96.58 | D |
| 44 | | | 4 | 100.11 | D | 98.90 | D | 96.71 | D |
| 45 | | | 5 | 97.64 | D | 96.86 | D | 95.89 | D |
| 46 | | | 6 | 99.87 | D | 98.83 | D | 96.58 | D |
| 47 | | | 7 | 95.62 | D | 96.75 | D | 95.23 | D |

(3) Evaluation Results

As can be seen from Table 3, for the recorded objects in the experiments Nos. 41 to 47 in which the infrared absorptive ink was not used, the evaluation results of the infrared absorptivity were "D" at all the wavelengths (900 nm, 1,400 nm and 2,000 nm).

In each of the experiments Nos. 6 to 40, the water-based ink set for ink-jet recording composed of the infrared absorptive ink comprising the ATO fine particle and the color ink was used to record the recorded object. In these cases, the evaluation results of the infrared absorptivity were "D" at wavelengths of 900 nm and 1,400 nm when the amount of the ATO fine particles in the infrared absorptive ink was 0.1 wt % and at a wavelength of 900 nm when the amount of the ATO fine particles was 0.5 wt %. In addition, some of the evaluation results of the infrared absorptivity were "D" at a wavelength of 900 nm when the amount of the ATO fine particles was 1.0 wt %. The rest of the evaluation results of the infrared absorptivity in this case were at least "C." In particular, the evaluation results of the infrared absorptivity were excellent, or "AA," at a wavelength of 900 nm when the amount of the ATO fine particles was 3.0 wt % and at wavelengths of 1,400 nm and 2,000 nm when the amount of the ATO fine particles was 5.0 wt %.

In each of the experiments Nos. 1 to 5, only the infrared absorptive ink was used to record the recorded object. In these cases, the evaluation results of infrared absorptivity were similar to those when the water-based ink set for ink-jet recording was used. It was found that the color inks do not impair the characteristics of the infrared absorptive inks.

The present invention is not limited to the embodiments described in the Examples, which are provided for illustrative purposes only. The material substances, their amounts used, and the conditions of producing them may be varied and modified without departing from the spirit and the scope of the invention as described herein.

What is claimed is:

1. A water-based ink set for ink-jet recording, comprising: a colorless transparent infrared absorptive ink comprising an antimony-tin composite oxide fine particle and water; and a color ink comprising a coloring agent and water.

2. The water-based ink set for ink-jet recording according to claim 1, wherein an amount of the antimony-tin composite oxide fine particle in the colorless transparent infrared absorptive ink is in a range of from about 0.3 wt % to about 10 wt %.

3. The water-based ink set for ink-jet recording according to claim 1, wherein the antimony-tin composite oxide fine particle have an average particle diameter of from about 5 nm to about 800 nm.

4. The water-based ink set for ink-jet recording according to claim 3, wherein the antimony-tin composite oxide fine particle have an average particle diameter of about 200 nm or less.

5. The water-based ink set for ink-jet recording according to claim 3, wherein the antimony-tin composite oxide fine particle have an average particle diameter of about 10 nm or more.

6. The water-based ink set for ink-jet recording according to claim 1, wherein the coloring agent is a water-soluble dye, and the amount thereof with respect to the total amount of the color ink is in the range of from about 0.1 wt % to about 10 wt %.

7. The water-based ink set for ink-jet recording according to claim 1, wherein the coloring agent is an infrared transparent pigment, and the amount thereof with respect to the total amount of the color ink is in the range of from about 1 wt % to about 10 wt %.

8. The water-based ink set for ink-jet recording according to claim 7, wherein the infrared transparent pigment has a particle diameter of about 5 nm to about 800 nm.

9. The water-based ink set for ink-jet recording according to claim 1, wherein the infrared absorptive ink and the color ink each comprise water in an amount of about 10 wt % to about 95 wt %, and as soluble organic solvents, a humectant in an amount of about 5 wt % to 50 wt % and a penetrant in an amount of about 0.5 wt % to 10 wt %, with respect to the total amount of the water-based infrared absorptive ink and the color ink respectively.

10. An ink-jet recording method for recording an image by ejecting at least one ink of a plurality of different inks constituting an ink-set for ink-jet recording onto a recording medium to cause the ink to adhere to the recording medium, wherein the ink-set for ink-jet recording is a water-based ink set for ink-jet recording comprising: a transparent colorless infrared absorptive ink that comprises an antimony-tin composite oxide fine particle and water; and a color ink that comprises a coloring agent and water, and wherein an image having infrared absorptivity is recorded by ejecting at least the infrared absorptive ink onto a recording medium to cause the infrared absorptive ink to adhere to the recording medium, and wherein an invisible image is recorded with the infrared absorptive ink and a visible image is recorded with the color ink, and wherein the invisible and visible images are formed such that at least parts thereof overlap with each other on the recording medium.

11. An ink-jet recording method for recording an image by ejecting at least one ink of a plurality of different inks constituting an ink-set for ink-jet recording onto a recording medium to cause the ink to adhere to the recording medium, wherein the ink-set for ink-jet recording is a water-based ink set for ink-jet recording comprising: a transparent colorless infrared absorptive ink that comprises an antimony-tin composite oxide fine particle and water; and a color ink that comprises a coloring agent and water, and wherein an image having infrared absorptivity is recorded by ejecting at least the infrared absorptive ink onto a recording medium to cause the infrared absorptive ink to adhere to the recording medium, and wherein an invisible image is recorded with the infrared absorptive ink and a visible image is recorded with the color ink, and wherein the invisible and visible images are formed so as not to overlap with each other on the recording medium.

* * * * *